United States Patent [19]

Mitter

[11] 4,223,602

[45] Sep. 23, 1980

[54] STENCIL PRINTER

[76] Inventor: Mathias Mitter, Falkenstrasse 57, 4815 Schloss Holte, Fed. Rep. of Germany

[21] Appl. No.: 905,870

[22] Filed: May 15, 1978

[30] Foreign Application Priority Data

May 16, 1977 [DE] Fed. Rep. of Germany ....... 2722060

[51] Int. Cl.[3] ........................ B41F 15/36; B23Q 7/06; B65D 21/02

[52] U.S. Cl. ............................... 101/128.21; 101/114; 101/129; 108/91; 206/509; 211/188; 221/293; 312/42

[58] Field of Search ..................... 101/126, 127, 127.1, 101/128, 128.1; 214/8.5 K; 206/509, 511, 512; 211/188, 194; 312/42, 118, 244; 221/292, 293, 298; 108/53.1, 91, 147

[56] References Cited

U.S. PATENT DOCUMENTS

| | | | |
|---|---|---|---|
| 548,056 | 10/1895 | Hewitt | 214/8.5 K |
| 707,961 | 8/1902 | Elliott | 101/127.1 |
| 1,986,716 | 1/1935 | Downey | 206/511 |
| 2,206,176 | 7/1940 | Foard | 101/126 |
| 2,218,451 | 10/1940 | Heyne | 101/127.1 |
| 2,470,765 | 5/1949 | Dunston | 211/188 |
| 2,599,262 | 6/1952 | Kredcris | 214/8.5 K |
| 2,730,144 | 1/1956 | Joa | 214/8.5 K |
| 2,978,125 | 4/1961 | Freeman | 214/8.5 K |
| 3,955,681 | 5/1976 | DeZinno | 206/511 |
| 4,072,090 | 2/1978 | Heisler | 221/298 |

FOREIGN PATENT DOCUMENTS

| | | | |
|---|---|---|---|
| 1157711 | 12/1957 | France | 101/127.1 |
| 1249871 | 10/1971 | United Kingdom | 206/511 |
| 495186 | 3/1976 | U.S.S.R. | 214/8.5 K |

*Primary Examiner*—Clyde I. Coughenour
*Attorney, Agent, or Firm*—Michael J. Striker

[57] ABSTRACT

A stencil printer has a vertical stack of frame-mounted stencils which are supported on one another. Laterally of the stack are arranged holding devices which engage the stencil which is second from the bottom so as to support the stack, while lifting devices are provided which lower the bottom stencil relative to the stack to a printing position and, subsequent to printing, raise it out of the printing position to an intermediate position in which it can be laterally withdrawn from the stack to be placed atop the same. The stack is then lowered by the height of one frame.

7 Claims, 8 Drawing Figures

1
II
31
3
15
13
12
14
33
21
22
2
10
IV
1
III
2
12
33
16
20
3
30
PRESSURE FLUID SOURCE
PRESSURE FLUID SOURCE 1
10
11
13
112
212
312
412

1
10
11
12
13

2
10
12
13
16
21
22
113

STENCIL PRINTER

BACKGROUND OF THE INVENTION

1. Field of the Invention

The present invention relates to printing machines in general.

More particularly, the invention relates to stencil printers.

Still more specifically, the invention relates to a stencil printer of the type wherein a series of frame-mounted stencils is seriatim lowered into a position for printing onto a workpiece.

2. The Prior Art

Stencil printers using frame-mounted printing stencils (flat printing screens) are known. For example, German allowed application DT-AS No. 1,252,167 discloses a stencil printer in which the workpiece to be printed is intermittently advanced past a printing station. After every advancing step a stencil is lowered onto the workpiece, printing ink or another medium to be applied by screen printing is admitted onto the upper surface of the stencil, and a squeegee then squeezes the medium through the stencil perforations and onto the workpiece.

If machines of this type print only with a single color, then only one printing stencil is required. If, however, multi-color printing is required, then the machines may be provided with a plurality of printing stations (each having a stencil for a different color) which are arranged one behind the other along the path of movement of the workpiece. A disadvantage of such an arrangement is that multi-color printers of this type must be very long since each of the printing stations requires a substantial amount of space. This is particularly pronounced when a pattern to be printed requires a very complicated color spectrum, in which case up to twelve printing stations, each with its own stencil, may have to be arranged one behind the other. The machine must thus be so extraordinarily long that a great many potential users simply do not have adequate space to install it.

In addition, there is a further drawback to the use of such long machines, namely the fact that when the workpiece is transported over such long distances, it tends to stretch out of shape—a particular problem with heavy workpieces such as yard-goods carpeting—with the result that pattern rapport from station to station is destroyed.

To overcome these problems it has been proposed to mount the series of stencils required for multi-color printing in a stacking frame at a single printing station, and to provide an arrangement for lowering the respectively lowermost stencil relative to the stacking frame and into printing position. This certainly reduces the overall length of the printer. However, it has two other distinct disadvantages, in that the stacking frame and the associated screen lowering mechanism are complicated and therefore expensive and prone to malfunction, and further that the predetermined printing sequence of the stencils in the stacking frame can be altered and/or any of the stencils in the stacking frame can be extracted or exchanged, only with considerable difficulty.

SUMMARY OF THE INVENTION

It is an object of the invention to overcome the disadvantages of the prior art.

More particularly, it is an object of the invention to provide an improved stencil printer which is not subject to these disadvantages.

A still more particular object is to provide an improved stencil printer of the type having a vertical stack of stencils which are not, however, mounted in a stacking frame.

A concomitant object is to provide a stencil printer of the type in question which is relatively uncomplicated in its construction and operation, and which is therefore much more reliable in operation.

An additional object is to provide an improved stencil printer which is of simple construction and therefore relatively inexpensive.

In pursuance of these objects, and still others which will become apparent hereafter, one aspect of the invention resides in a stencil printer which, briefly stated, may comprise a plurality of stencils each including a stencil frame and a stencil screen mounted in the same; interengageable means on the frames for enabling the stencils to be vertically superposed to form an upright stack which is upwardly spaced from a printing plane; first means for lowering the respectively lowermost stencil of the stack to the printing plane so as to be available for printing onto a workpiece; and second means for holding the remaining stencils of the stack upwardly spaced from the printing plane and from the lowered stencil.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 3:
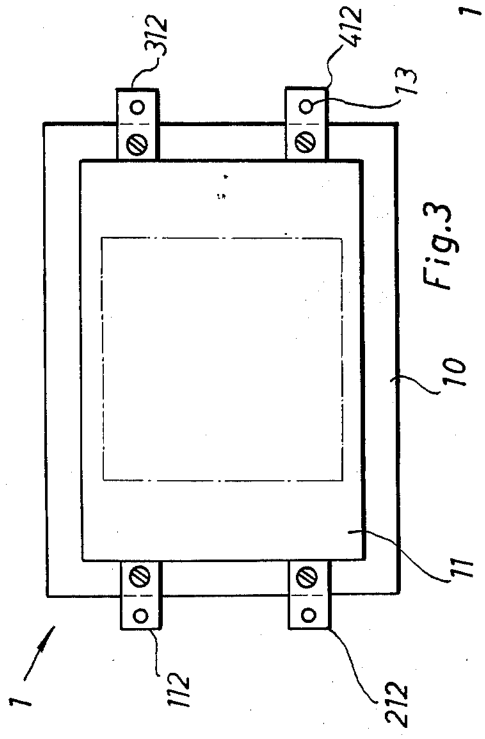
FIG. 3 is a top-plan view of one type of stencil for use in the apparatus according to the invention.

The stencil printer according to the invention utilizes a stack 15 (FIG. 1) of flat-screen printing stencils 1. In the embodiment of FIG. 3 each such stencil 1 has a mounting frame 10 in which the actual stencil screen 11 is mounted in the manner conventional in this art. For orientation purposes the pattern area of the stencil is shown in chain lines in FIGS. 3, 4 and 5. Each frame 10 is provided at two opposite sides with respective pairs of mounting lugs; in FIG. 3 the lugs at one side are identified with reference numerals 112 and 212; the lugs at the other side have reference numerals 312 and 412. The lugs are mounted in the general vicinity of the corners of the frame 10 and each lug (e.g. 112, 212) has a corresponding lug (e.g. 312, 412) located opposite it. The lugs are preferably secured to the frame by means of screws (as diagrammatically shown), but other securing means could be employed.

Figure 4:
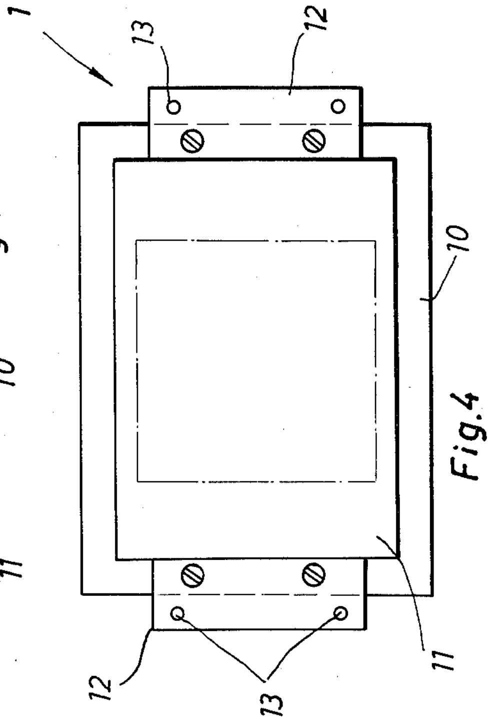
FIG. 4 is a view similar to FIG. 1 but of a different type of stencil.

Alternatively, FIG. 4 shows an embodiment which is otherwise the same as the one in FIG. 3 but wherein each of the two opposite frame sides is provided only with a single long lug 12.

Figure 1:
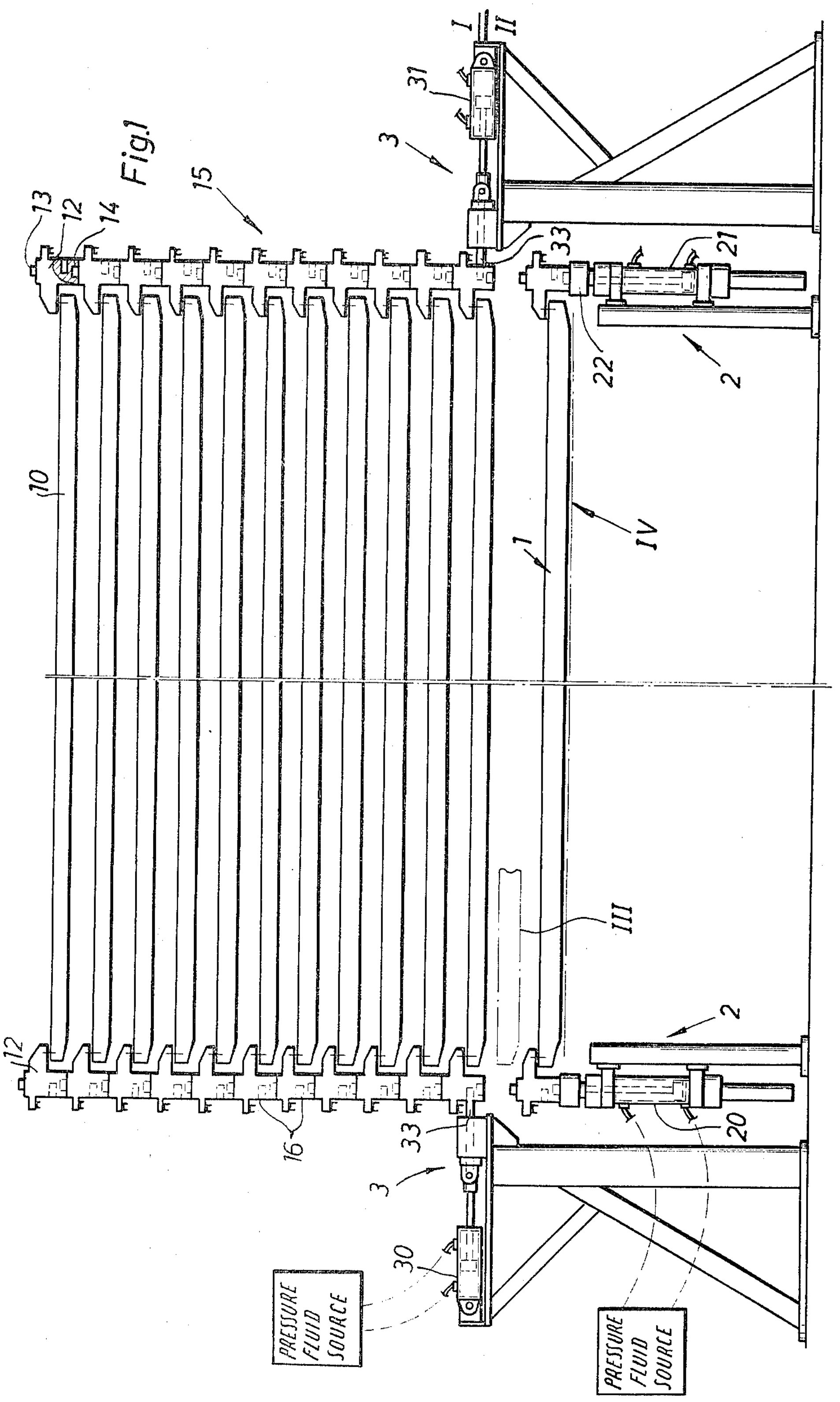
FIG. 1 is a diagrammatic cross-section through a stencil printer according to the invention, showing the stencil stack in a front end view.

The upper sides of the lugs 12 (FIG. 4) or 112, 212, 312 and 412 (FIG. 3) are provided with projections 13, such as studs or pins. The lower sides of these same lugs are provided, directly below the respective pins 13, with recesses 14 which are so positioned and dimensioned that, when two or more of the stencils 1 are stacked atop one another, the pins 13 of each subjacent stencil 1 will enter the recesses of the superjacent stencil whereby the stencils are vertically aligned and held in position (FIG. 1). Of course, each lug may be provided with more than one projection 13 and with a corresponding number of recesses 14.

Figure 2:
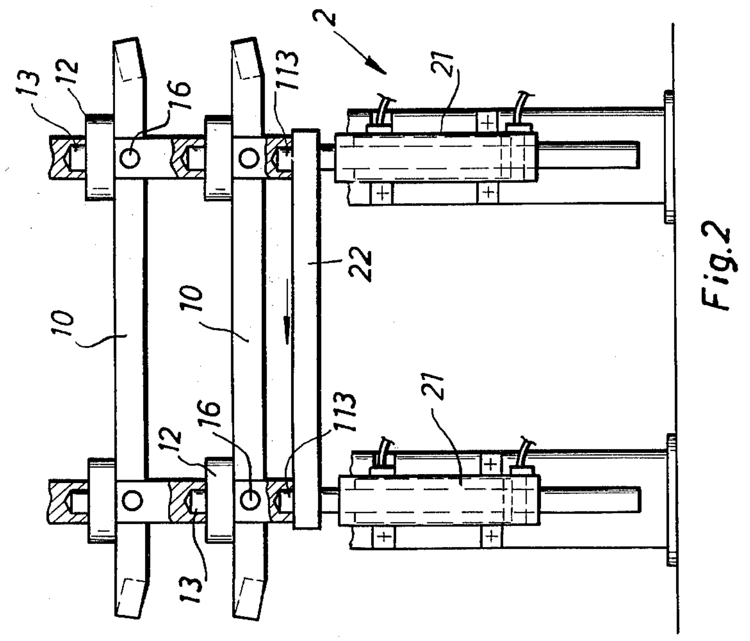
FIG. 2 is a partly sectioned fragmentary side view of FIG. 1, with parts omitted for clarity.

As shown in FIGS. 1 and 2, the stencil printer according to the invention has a stack 15 which is composed of any desired number of the stencils 1. Laterally of the stack 15, at opposite sides of the same, devices 3 are arranged which serve to hold the stack 15 suspended above the printing plane IV. It should be understood that for the sake of clarity the workpiece and the workpiece-support table have not been shown, but that the workpiece will be intermittently advanced in the plane IV and in direction normal to the plane of the drawing (FIG. 1).

Those lateral sides of the frames 10 where the lugs are located are also provided with transverse (horizontal) bores 16, as shown in FIGS. 1 and 2. The devices 3 each comprise two double-acting fluid-operated cylinder-and-piston units 30 and 31, respectively (only one of each visible in FIG. 1) having pins or rods 33 which will enter with some play into the slightly larger-dimensioned registering bores 16 of a respective frame 10 when the units 30, 31 are activated to extend (advance). When the pins 33 are in this position, which is shown in FIG. 1, they support the stack 15, except for the lowermost stencil 1 of the stack which at this time is to be used for printing.

To effect movement of the respectively lowermost stencil 1 to the printing position, i.e. to plane IV, a pair of lifting and lowering devices 2 is provided at the same sides as the devices 3. The devices 2 each have two fluid-operated cylinder-and-piston units 20 and 21 (only one of each is visible in FIG. 1, but both units 21 are seen in FIG. 2). The units of each device 2 may, but need not, be connected by a bar or bracket 22 (FIG. 2). The upper end portions 113 of their piston rods are dimensioned to be able to enter into the recesses 14 of the respectively lowermost stencil 1 and the units 20, 21 are of course so positioned relative to the stack 15 that such entry is possible.

The operation of the printing machine is as follows:

A requisite number of stencils 1 (one for each color to be printed) is superimposed to form the stack 15 in which each subjacent stencil supports the superjacent stencil and prevents its shifting due to the interengagement of projections 13 and recesses 14. One stencil 1 is in printing position immediately above the plane IV in which the workpiece (not shown) is located.

When printing with this stencil is completed the units 20, 21 are actuated and raise the stencil 1, in the recesses 14 of which their upper piston rod end portions 113 are engaged, to an extraction plane III. In this plane the stencil 1 is engaged and held by extraction equipment (not illustrated because known per se in this art) until the pistons of the units are retracted downwards sufficiently to withdraw the end portions 113 from the recess 14. The stencil 1 is now free to move and is pulled laterally (see the arrow in FIG. 2) out of the stack and is then raised by the extraction device and deposited atop the uppermost stencil of the stack 15. The extraction device forms no part of the invention and the extraction and deposition atop the stack 15 could, in fact, be carried out manually. Of course, instead of lowering the pistons of the units 20, 21 to withdraw the portions 113 from the recesses 14, the stencil 1 could be lifted slightly above the plane III, either manually or by the extraction device.

As soon as the stencil 1 has been thus extracted from the stack 15, the pistons of the units 20, 21 are raised higher until the portions 113 enter the recesses 14 of the lowermost stencil in the stack, i.e. the stencil, which is held by the rods 33 of the devices 3. When this movement, during which the entire stack is slightly raised so that the weight on rods 33 is released (this is indicated in a slightly exaggerated manner by plane I), is completed and the stack is now supported on the units 20, 21, the pistons of the cylinders 30, 31 are retracted so that the rods 33 leave the bores 16 of the lowermost stencil. The units 20, 21 are now retracted and lower the stack 15 until the next stencil (i.e. the one which is second from the bottom) is located in the plane II opposite the units 30, 31 whereupon these are extended so that their rods 33 enter into the bores 16 of this stencil. This again causes the stack 15 to be supported by the units 30, 31.

The previously lowermost stencil of the stack 15 is now effectively disengaged from the stack. It remains only for the units 20, 21 to be further retracted until the stencil supported by them is lowered to the printing plane IV, and the next printing step (e.g. with a different color) can now be carried out. It is noted that no ink supplies, squeegees or the like have been shown, because these are conventional in the art. When the printing episode is completed the stencil is raised to the plane III by the units 20, 21 and extracted, whereupon the cycle can be repeated.

Thus, the stencils of the stack 15 in effect move in a closed-circuit path which continues without interruption until the maximum required number of colors has been printed. During all this time the workpiece remains absolutely still at the single printing station, so that all problems of pattern-rapport loss due to stretching of the workpiece during advancement, are avoided. When all colors have been printed, i.e. when the pattern is complete, the circulation of stencils is briefly interrupted while the workpiece is advanced by an increment long enough to place a heretofore imprinted portion of the workpiece into the printing station. Thereafter, printing and circulation of the stencils are resumed. This is repeated until the required number of yards or meters of the workpiece has been printed.

It is clear that all kinds of workpieces can be printed in this manner, including textiles with high or low naps, non-wovens, paper webs and metal or synthetic plastic foil webs. Equally well, individual workpieces (rather than long webs) can be printed, provided only that they be supported on a suitable conveying device, e.g. an endless intermittently travelling printing blanket.

Figure 5:
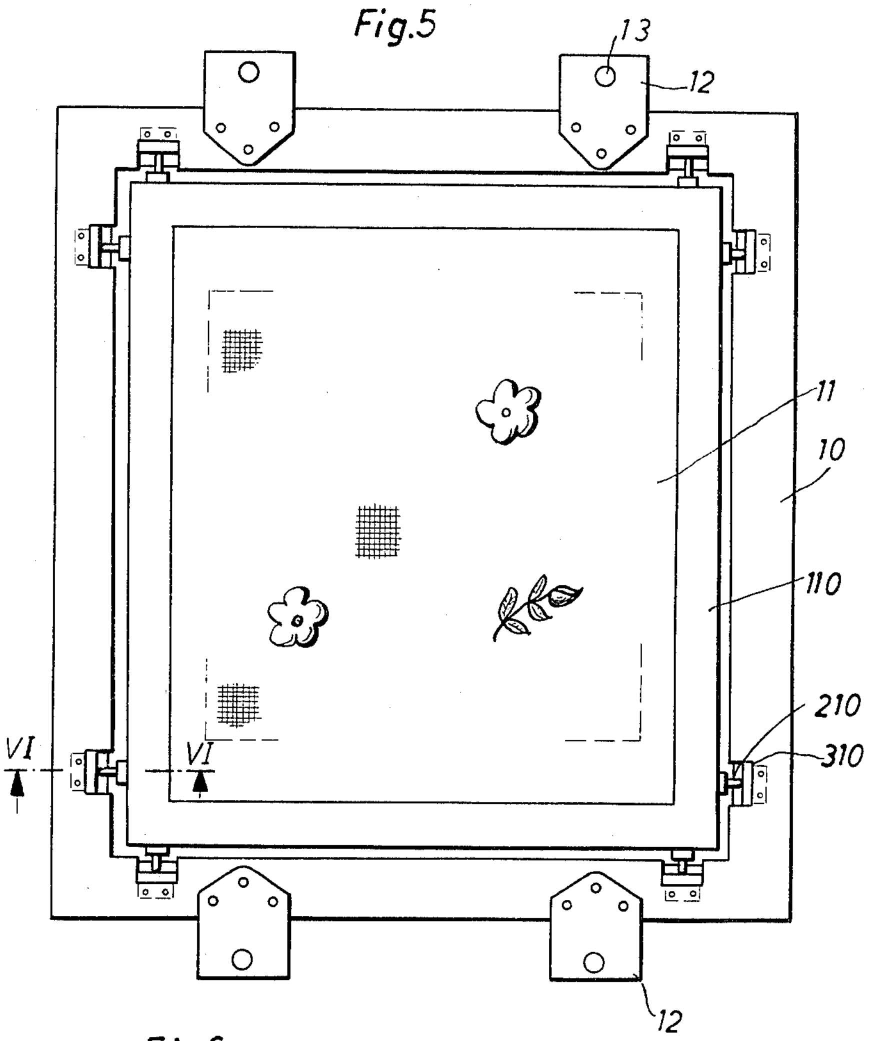
FIG. 5 is another top-plan view showing still a further type of stencil.
Figure 6:
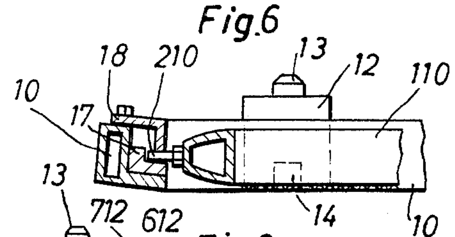
FIG. 6 is a section on line VI—VI of FIG. 5.

FIGS. 5 and 6 show that the frames 10 need not have the screen stencils 11 mounted in them directly. Instead, the stencils 11 can be mounted in an inner frame 110 which in turn is supported by the frame 10. In this embodiment the frame 10 corresponds basically to the construction described with reference to the preceding Figures, except that it is provided with recesses 310 in which support members 17 are mounted. The frame 110 is provided with a corresponding number of pins or bolts 210 which can preferably be threaded in and out and which rest on the members 17. To adjust the position of frame 110 in frame 10 the bolts or pins 210 are threaded in or out until the desired correction is obtained. Clamping bars 18 are mounted on the frame 10 at an angle (FIG. 6) and prevent the pins or bolts 210 from displacement relative to frame 10. The recesses 310 and bolts 210 are preferably located near all four corners of the frames 10, 110 and are advantageously arranged pairwise opposite each other.

Figure 7:
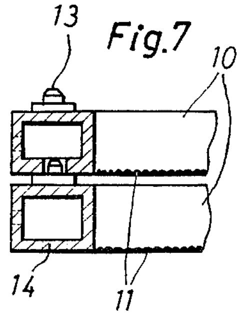
FIG. 7 is a fragmentary vertical section through the stacked frames of two stencils according to still another embodiment.

The lugs could be constituted by surface portions of the frame 10 itself, i.e. instead of projecting laterally beyond the frame. This is shown in FIG. 7 where it will be seen that in such event the projections 13 and recesses 14 would be provided directly on or in the upper and lower surfaces of the respective frame 10. However, the use of separate lugs, securable to the frames, is preferable because it permits the stencil printer to operate with conventional frames 10 rather than specially constructed ones, and makes the special configuration of the lugs with their projections and recesses independent of the frames. Also, it is easier to adjust the positioning of the frames 10 relative to one another in the stack 15 (i.e. to assure that projections 13 and recesses 14 will mate) when separate lugs are used which can be shifted (e.g. during installation or after installation if the mounting screws extend through crossed slots).

Figure 8:
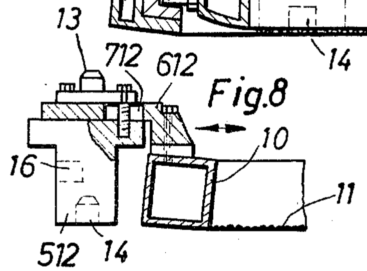
FIG. 8 is another vertical section, analogous to FIG. 6 but of yet an additional embodiment.

Finally, FIG. 8 shows an embodiment wherein the lugs 512 (one shown) have an upper plate 612 provided with an elongated slot 712 (this could be crossed by a similar slot intersecting it at right angles or at a different angle). Screws or bolts (shown) extend through the slot 712 and mount the plate 612 or the lug 512 so that the plate 612 can be shifted in the direction of the double-headed arrow by backing off the screws which are then retightened once the desired adjustment is made.

Of course, the construction in FIG. 8 may be varied within the skill of the art. What is important is that the embodiment of FIG. 8 or any modification thereof, permits the lugs to be adjusted relative to the outer edge of the frame 10 and, hence, relative to the stencil 11. This is necessary if the pattern is produced in the stencils before they are mounted in the frames 10, or in frames 10 having lugs as described before. In such a case the lugs are adjusted relative to the frames 10 until the pattern of every stencil in the stack is in precise registry (vertically) with the pattern of every stencil in the stack, thereby assuring exact pattern rapport during printing. Bar 22 could be used to engage the lowermost stencil 1.

While the invention has been illustrated and described as embodied in a stencil printer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. The devices for extracting the previously printed stencil from the stack and placing it on top of the stack are disclosed in my U.S. patent application Ser. No. 836,477 from Sept. 26, 1977.

What is claimed as new and desired to be protected by Letters Patent is set forth in the appended claims:

1. In a stencil-printing apparatus, a combination comprising a plurality of stencils each including a stencil frame and a stencil screen mounted in the same; interengageable means on said frames for enabling the stencils to be vertically superposed to form an upright stack which is upwardly spaced from a printing plane, said interengageable means including on opposite lateral sides of said frames respective transversely projecting lugs having projections and depressions, said lugs each including two parts and means connecting said two parts for movement relative to one another in the general plane of the respective frame; first means for lowering the respectively lowermost stencil of said stack to said printing plane so as to be available for printing onto a workpiece; and second means for holding the remaining stencils of the stack upwardly spaced from the printing plane and from the lowered stencil.

2. A combination as defined in claim 1, said frames each having four corners and each of said lateral sides being provided with two of said lugs which are arranged in the regions of the respective corners, each lug at one lateral side being located opposite one of the lugs at the other lateral side.

3. A combination as defined in claim 1, said frames each having four corners and each of said sides being provided with one of said lugs which is elongated in direction intermediate the respective corners.

4. A combination as defined in claim 1, wherein said first means comprises two pairs of upright fluid-operated cylinder-and-piston units mounted below and at opposite lateral sides of said stack.

5. A combination as defined in claim 1, said cylinder-and-piston units each having an upwardly facing piston rod provided with a free end portion which is engageable in recesses provided at the lower side of the respectively lowermost stencil of said stack.

6. A combination as defined in claim 1, said frames having sidefaces provided with bores which are substantially horizontally oriented when said stencils are stacked; and wherein said second means comprises two pairs of substantially horizontally oriented fluid-operated cylinder-and-piston units each having a portion insertable into one of the bores of the respectively lowermost stencil so as to support the stack.

7. A combination as defined in claim 1, said second means comprises two pairs of fluid-operated cylinder-and-piston units mounted at opposite lateral sides of the stack and operable to engage and be retracted from the respectively lowermost stencil of the stack.

* * * * *